United States Patent
Asokan

(10) Patent No.: US 7,924,811 B2
(45) Date of Patent: Apr. 12, 2011

(54) METHODS, SYSTEMS AND COMPUTER PROGRAM PRODUCTS FOR SUSPENDING PACKET-SWITCHED SESSIONS TO A WIRELESS TERMINAL

(75) Inventor: Ram Asokan, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1436 days.

(21) Appl. No.: 10/812,700

(22) Filed: Mar. 30, 2004

(65) Prior Publication Data

US 2005/0220079 A1   Oct. 6, 2005

(51) Int. Cl.
*H04L 12/66* (2006.01)

(52) U.S. Cl. ............... 370/352; 455/455; 455/412.2

(58) Field of Classification Search .............. 370/352, 370/331; 455/517–519
See application file for complete search history.

(56) References Cited

U.S. PATENT DOCUMENTS

| 5,745,695 | A | 4/1998 | Gilchrist et al. | |
|---|---|---|---|---|
| 2002/0172165 | A1 | 11/2002 | Rosen et al. | |
| 2003/0028602 | A1* | 2/2003 | Bhattacharya | 709/206 |
| 2004/0051900 | A1* | 3/2004 | Sagiya et al. | 358/1.15 |
| 2004/0142694 | A1* | 7/2004 | Levy et al. | 455/450 |
| 2005/0041640 | A1* | 2/2005 | Nasielski et al. | 370/352 |
| 2005/0169223 | A1* | 8/2005 | Crocker et al. | 370/342 |

FOREIGN PATENT DOCUMENTS

| EP | 1 096 813 | 5/2001 |
|---|---|---|
| JP | 2002-500487 | 1/2002 |
| WO | WO 97/26764 | 7/1997 |
| WO | WO 99/34617 | 7/1999 |
| WO | WO 03/101007 A1 | 12/2003 |

OTHER PUBLICATIONS

Ericsson et al. "Push-to-talk over Cellular (PoC); Signaling Flows; PoC Release 1.0" *Signaling Flows* V1.1.3 pp. 1-115 (2003).
International Search Report and Written Opinion of the International Searching Authority for Application No. PCT/US2004/037391 mailed on Apr. 15, 2005.
Chinese Office Action dated Sep. 1, 2010; Corresponding to CN Patent Application No. 200480042564.6, 9 pages.
Japanese Final Rejection dated Sep. 27, 2010; Corresponding to JP Patent Application No. 2007-506134, 2 pages.
Japanese Office Action (3 pages) corresponding to Japanese Patent Application No. 2007-506134; Mailing Date: Jun. 14, 2010.

* cited by examiner

*Primary Examiner* — Lester Kincaid
*Assistant Examiner* — Marcos Batista
(74) *Attorney, Agent, or Firm* — Myers Bigel Sibley & Sajovec, P.A.

(57) ABSTRACT

Methods, systems and computer program products are provided through which a wireless terminal participating in a packet-switched communications session may temporarily suspend the session, for example, upon receipt of an incoming circuit-switched call. The wireless terminal may notify a server associated with the packet-switched session of receipt of the incoming circuit-switched call, and may also notify the server when the packet-switched session may be resumed. In embodiments of the present invention implemented in GSM networks, one or more of the notification messages may be transmitted to the server over the SMS data bearer.

17 Claims, 5 Drawing Sheets

METHODS, SYSTEMS AND COMPUTER PROGRAM PRODUCTS FOR SUSPENDING PACKET-SWITCHED SESSIONS TO A WIRELESS TERMINAL

FIELD OF THE INVENTION

The present invention relates to wireless communications and, more particularly, to methods, systems and computer program products for use in wireless terminals that support packet-switched communications.

BACKGROUND OF THE INVENTION

Analog cellular telephone systems, such as AMPS, ETACS, NMT-450, and NMT-900, have long been deployed successfully throughout the world. Since the early 1990's, digital cellular telephone systems such as those conforming to the North American standard IS-54 and the European Global System for Mobile Communications ("GSM") standard have been in service. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

In most cellular radiotelephone systems, the cellular system sets up a distinct, full-duplex, circuit-switched channel for each standard voice telephone call that is carried by the system. Depending upon the cellular system, this circuit-switched channel may be implemented, for example, as an FDMA channel, a TDMA channel, a TDMA/CDMA channel, etc. The circuit-switched channel is established by the cellular network at the time the call is initiated and is maintained until the call is terminated.

In recent years, various cellular telephone systems have implemented capabilities for supporting additional types of communications. By way of example, cellular systems that operate under the GSM standard may provide various packet-switched communications services that may be implemented according to the General Packet Radio Service ("GPRS") standards that are part of the GSM standard. Such packet-switched communications services may include e-mail, web-browsing, instant messaging and the like. Another communication capability that has received increased interest in recent years is a "push-to-talk" capability. Push-to-talk refers to a "walkie-talkie" like feature where two users (point-to-point talk) or a larger group of users (group-talk) may engage in instant communications. Once a push-to-talk communications session is established, participants in the session typically do not need to dial a phone number to converse with other participants. The communications session may be left open for extended periods of time, even if the participants are in stand-by mode (i.e., not actually conversing). When a participant chooses to converse with another participant of the push-to-talk session, they typically need only push and hold a button on their cell phone (or other wireless terminal) and speak into the microphone.

The Open Mobile Alliance ("OMA") has established a working group that is in the process of defining a specification under which a push-to-talk capability will be implemented for GSM and other cellular systems. While there are potentially a variety of different ways that such a push-to-talk capability could be implemented, the OMA is defining specifications whereby the push-to-talk capability will be implemented using voice-over-IP resources that are transmitted over GPRS. Voice-over-IP ("VoIP") refers to a form of packet-switched communications capability that operates over the Internet Protocol ("IP") to support voice communications. In a VoIP system, voice communications are digitized and transmitted in small data packets over a communications network to the intended recipients. The data packets may travel over different paths through the network and are reassembled into their proper order at the destination so that they may be converted back into an analog voice signal that may be played to the remote user. Under current OMA plans, on the cellular network side, GPRS will be used to implement the VoIP push-to-talk capability. Wireless terminals that implement the push-to-talk capability will, therefore, have both a cellular address and an IP address (URL).

The push-to-talk capability may be implemented as a half-duplex channel that is shared by all of the participants of the push-to-talk session. A wireless terminal user may arrange for establishment of the push-to-talk session by, for example, dialing a number on the keypad of their cellular telephone (or other wireless terminal) that is associated with the remote user to whom they wish to speak. The wireless terminal sends a page to a network server notifying the network server of the request for establishment of a push-to-talk session. The network server establishes a push-to-talk session between the user and the remote user. The push-to-talk session may be established between two users (point-to-point) or between three or more users (group talk). The push to talk session typically is maintained until it is terminated by one of the users.

Once the push-to-talk session has been activated, either participant may send a floor request (a request to use the half-duplex channel) by pushing a button on their wireless terminal. The network server may indicate that the floor request has been granted by, for example, an audio tone. Once the user has been granted the floor he may broadcast speech over the channel by talking while holding in the button. Release of the button acts to release the floor so that the half-duplex channel may then be used by another participant to the call or remain idle. While the push-to-talk session is active, it provides the user and remote user(s) an instant talk capability for communicating with each other.

Under the current plans of the OMA working group, the GPRS push-to-talk transport protocol will use the Session Initiated Protocol ("SIP") and the Session Description Protocol ("SDP") for transmission of control and signaling information, and will use the Real Time Protocol ("RTP") for transmitting data (i.e., the voice traffic). The Real Time Control Protocol ("RTCP") will be used to transmit floor request/notification signals (i.e., the signals that are sent when a user grabs the channel by pressing the push-to-talk button on the wireless terminal and releases the channel by releasing the button) and the start/end burst packets. The present OMA proposal is to implement the push-to-talk channel using a 4.75 kbps adaptive multi-rate (AMR) coded speech data channel, with other data rate channels to possibly be added later.

SUMMARY OF THE INVENTION

Embodiments of the present invention provide methods for a wireless terminal participating in a packet-switched communications session to send notice of receipt of an incoming circuit-switched call. In these methods, a paging request associated with the incoming circuit-switched call is received at the wireless terminal. A server associated with the packet-switched communications session is then notified that the wireless terminal has received the incoming circuit switched call.

In certain embodiments of the present invention, the incoming circuit-switched call may be a circuit-switched call that is transmitted over a GSM network. In such embodiments, the notification to the server may be accomplished by forwarding a notification message from the wireless terminal to the server over the data bearer for the circuit switched SMS channel ("the SMS data bearer"). The notification message may be implemented, for example, as a text message or an e-mail message. The notification message may, alternatively, be forwarded to the server via, for example, an IP level connection that uses the SMS data bearer. In still other embodiments, the notification message may be forwarded over a packet-switched channel before, during or after the wireless terminal answers the incoming circuit-switched call (if the wireless terminals support such a capability). Additionally, one or more remote terminals may also be notified that the wireless terminal has temporarily suspended participation in the packet-switched communications session.

The initial notification message may include an identification associated with the wireless terminal and/or an estimate of the length of the incoming circuit-switched call.

Estimates of the length of the circuit-switched call may be obtained, for example, based on average call-length data stored at the wireless terminal (which may be an average of all calls, a subset of all calls, all received calls, all calls coming from the number associated with the incoming circuit-switched page, etc.). The server associated with the packet-switched communications session may also receive a notification message upon termination of the incoming circuit-switched call at the wireless terminal. This notification may be forwarded, for example, over the SMS data bearer and/or via the GPRS connection once such a connection has been resumed.

Pursuant to further embodiments of the present invention, methods of temporarily suspending a push-to-talk session established by a communications server between a first wireless terminal and a second wireless terminal are provided. In these methods, the first wireless terminal suspends the push-to-talk session. The first wireless terminal further notifies the communications server that it has suspended the push-to-talk session. This notification may be accomplished, for example, by forwarding a notification message from the first wireless terminal to the communications server over the GSM SMS data bearer. This notification message may, for example, be an e-mail or a text message, or alternatively may be forwarded via an IP level connection. Subsequently, the first wireless terminal may reestablish the push-to-talk session. These methods for temporarily suspending a push-to-talk session may also be used in group talk situations that involve push-to-talk communications between three or more wireless terminals.

While described above primarily with respect to methods, as will further be appreciated by those of skill in the art, the present invention may be embodied as methods, systems, wireless terminals and/or computer program products.

DETAILED DESCRIPTION

Figure 1:
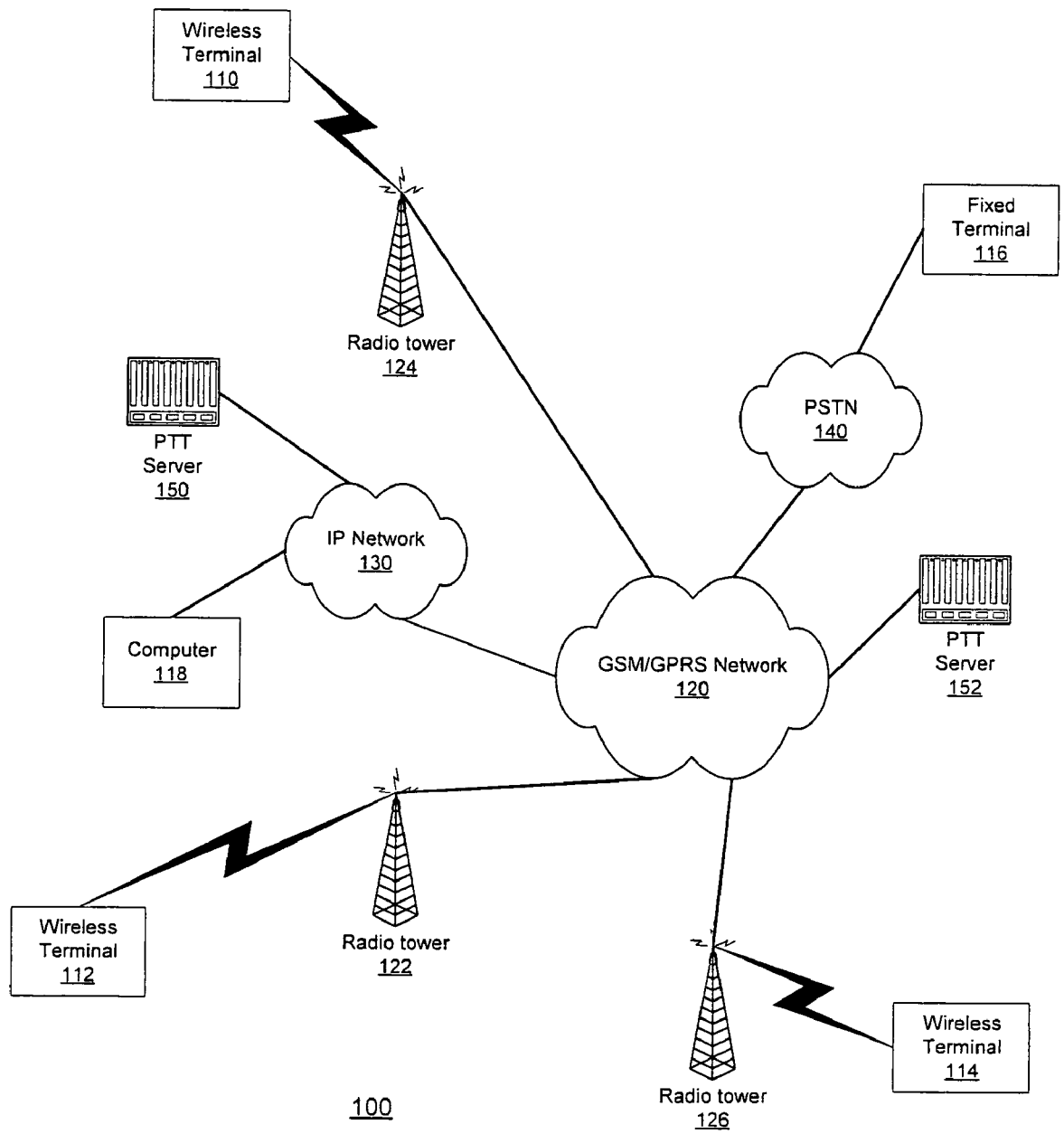
FIG. 1 is a schematic diagram illustrating a network in which the methods, systems and computer program products of the present invention may be used.

The present invention will now be described more fully with reference to the accompanying drawings, in which exemplary embodiments of the invention are shown. This invention, however, may be embodied in many different forms and should not be construed as limited to the embodiments set forth herein. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures. Also, as used herein, the term "and/or" includes any and all combinations of one or more of the associated listed items.

The present invention is described, in part, below with reference to block diagrams and/or flowchart illustrations of methods, systems and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

As will be appreciated by one of skill in the art, the present invention may be embodied as a method, system and/or computer program product. Thus, the present invention may take the form of an entirely hardware embodiment, an entirely software embodiment or an embodiment combining software and hardware aspects, which may be collectively referred to herein as a "circuit" or "module."

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a schematic diagram illustrating a network 100 in which embodiments of the methods, systems and computer program products of the present invention may be used. As shown in FIG. 1, the network 100 may include a plurality of wireless terminals 110, 112, 114. The "wireless terminals" of FIG. 1 include, but are not limited to, terminals that are configured to communicate via a cellular wireless interface. However, it will also be appreciated that in certain embodiments of the present invention the wireless terminals may be configured to communicate via other wireless interfaces such as, for example, a wireless local area network interface (WLAN), a Bluetooth interface, another RF communication interface, and/or an optical interface. Example wireless terminals include, but are not limited to, a cellular wireless terminal; a personal communication terminal that may combine a cellular wireless terminal with data processing, facsimile and data communications capabilities; a personal data assistance (PDA) that can include a wireless transceiver, pager, Internet/intranet access, local area network interface, wide area network interface and/or Web browser; and a mobile or fixed computer or other device that includes a wireless transceiver. Moreover, while the exemplary embodiments of the invention described herein are primarily described in the context of a GSM/GPRS cellular system, it will be appreciated that embodiments of the present invention may also be implemented in wireless terminals that are configured to communicate via a cellular communication link that may include other protocols such as, for example, ANSI-136, enhanced data rates for GSM evolution (EDGE), code division multiple access (CDMA), wideband-CDMA, CDMA2000, UMTS and the like.

The exemplary network 100 illustrated in FIG. 1 includes a GSM/GPRS network 120. As will be understood by those of skill in the art, the GSM/GPRS network 120 includes a plurality of network elements (not depicted in FIG. 1) that enable cellular radiotelephone communications according to the GSM/GPRS standards. The wireless terminals 110, 112, 114 communicate via wireless links with radio towers 122, 124, 126 which serve as access points for the wireless terminals 110, 112, 114 to the GSM/GPRS network 120. The GSM/GPRS network 120 is connected to the Public Switched Telephone Network ("PSTN") 140, allowing communications between the wireless terminals 110, 112, 114 and fixed terminals 116 (e.g., a landline telephone) that are connected to the PSTN 140. As shown in FIG. 1, the GSM/GPRS network 120 is also connected to one or more internet protocol networks 130, thereby providing for the transmission of packet radio communications (e.g., e-mail messages, web browsing, instant messaging, etc.) between the wireless terminals 110, 112, 114 and other devices such as servers/computers 118 that are connected to the IP network 130.

As is also shown in FIG. 1, the network 100 may further include one or more push-to-talk servers 150, 152. The push-to-talk servers 150, 152 may be connected to the GSM/GPRS network 120 and/or the IP network 130. The push-to-talk servers 150, 152 run a push-to-talk application which may be used to establish and control push-to-talk communications sessions.

As will be understood by those of skill in the art, wireless terminals have differing capabilities in terms of their ability to simultaneously support both circuit-switched and packet-switched communications. By way of example, certain GSM terminals (e.g., Class-B terminals) can support both circuit-switched and GPRS (packet-switched) transports, but cannot support both transports simultaneously. A Class-B GSM terminal is typically configured so that, in standby mode, it monitors for both circuit-switched and packet-switched pages. If a page is received, the terminal switches to the appropriate mode (i.e., circuit-switched or packet-switched) and responds to the page. Typically, once a Class-B terminal is on a circuit-switched call, it ceases to monitor for packet-switched pages until the circuit-switched call is terminated. However, while the terminal is on a packet-switched call, it may continue to monitor for circuit-switched pages and, upon receipt of such a page, the terminal may automatically terminate the packet-switched call and switch to circuit-switched mode to establish the circuit-switched call.

When a Class-B terminal is on certain types of packet-switched calls, such as receiving an e-mail message or web browsing, the automatic switch-over to circuit-switched mode in response to receipt of a circuit-switched page may be seamless. The receipt of the e-mail message is suspended for the duration of the circuit-switched call and may then be resumed once the circuit-switched call is completed. However, for other packet-switched applications such as, for example, push-to-talk calls or instant messaging, the receipt of a circuit-switched call may interrupt an ongoing conversation between the user of the wireless terminal and a remote user. Neither the push-to-talk server or the other users participating in the push-to-talk session are typically provided any indication as to why the conversation was interrupted, when and if it can be resumed, or any other information. As a result, the remote user may spend time and use system resources trying to reestablish the packet-switched communication during the time the wireless terminal is on the circuit-switched call.

Under the proposed push-to-talk capability for GSM, in response to the initiation of the push-to-talk application at a wireless terminal, a registration request is forwarded to a push-to-talk server. The push-to-talk server activates a PDP (Packet Data Protocol) context to establish a GPRS connection between the push-to-talk server and each wireless terminal that is to be part of the push-to-talk session. This GPRS connection carries both the SIP control messages that are used to establish the push-to-talk session and the RTP voice data packets that comprise the push-to-talk call. The PDP context typically is kept alive, often for many hours, until the push-to-talk session is terminated by one of the users. Thus, the PDP context may provide the "always-on" connection that allows for the "instant talk" feature of the push-to-talk communications capability.

When a Class-B GSM terminal is participating in a push-to-talk session, it may receive a circuit-switched page indicating that there is an incoming circuit switched call. If the Class-B terminal is in standby state (i.e., not actually transmitting or receiving voice data packets under the PDP context), the terminal exits the packet-switched channel and switches to a circuit-switched channel to establish the circuit-switched call. If the terminal is in an active state with respect to the push-to-talk session (e.g., transmitting or receiving voice data packets) at the time the circuit-switched page is received, some Class-B terminals are capable of listening for circuit-switched pages (so that they can drop the packet-switched session and answer the circuit-switched call) while other Class-B terminals are not (and thus may miss the circuit-switched page). When the Class-B terminal switches to the circuit-switched channel, the terminal suspends the GPRS connection at the radio resource ("RR") level, thereby ending data transmissions between the terminal and the GPRS network over the GPRS connection. However, the PDP context remains established between the push-to-talk server and the wireless terminal at the GPRS Session Management layer. If the user of the wireless terminal accepts the incoming call, the wireless terminal remains on the circuit-switched channel until the end of the call. Upon termination of the circuit-switched call, the GPRS connection at the RR level is resumed and the push-to-talk session may then continue.

The push-to-talk server may be unaware that the wireless terminal has suspended the GPRS connection to answer the circuit-switched call. As such, the push-to-talk server may continue to transmit RTP voice packets and/or SIP control packets to a wireless terminal that has suspended its GPRS connection.

Other types of GSM terminals (e.g., Class-A and Dual Transfer Mode terminals) can typically simultaneously support both circuit-switched and packet-switched communications. As such, these terminals generally do not have to suspend an established GPRS session when responding to a circuit-switched page. Thus, a user of a Class-A GSM terminal may be able to simultaneously hold a circuit-switched call while sending/receiving e-mail and/or browsing the internet. However, even with Class-A and Dual Transfer Mode GSM terminals, a user typically cannot simultaneously listen to or talk on a circuit-switched call and a push-to-talk communications session as these terminals generally have only a single user interface (e.g., speaker, microphone, etc.) which can only serve one call at a time. For example, a user who attempted to listen to both sessions simultaneously would create a time conflict caused by overlapping usage of a common speaker on the wireless terminal.

Methods, systems and computer program products are disclosed herein for a wireless terminal that is communicating over a packet-switched session to provide notice of receipt of an incoming circuit-switched call. For example, pursuant to some embodiments of the present invention, a wireless terminal that is participating in an ongoing packet-switched session may notify a server that is associated with the session that the packet-switched session is to be suspended. The notification may further provide information regarding the reason prompting suspension of the packet-switched session such as, for example, receipt of a circuit-switched page by the wireless terminal. In some embodiments of the present invention, the packet-switched server may further notify one or more remote wireless terminals, servers and/or other devices regarding suspension of the packet-switched session. In this manner, uncertainty which may result from the abrupt termination of the packet-switched session and the possible waste of system resources in efforts to prematurely reestablish the call may be reduced and/or avoided altogether.

In certain embodiments of the present invention, a circuit-switched connection may be used to provide the notification message from the wireless terminal to the packet-switched server. By way of example, in the GSM system, the notification message may be transmitted over the Short Message Service ("SMS") data bearer. The SMS data bearer is the circuit-switched connection that is used to transport the Short Message Service messages that are provided for under the GSM standard. The SMS data bearer can coexist with the channels used to support both circuit-switched voice calls (e.g., the TCH channel) and circuit-switched control signals (e.g., the SDCCH channel). Thus, the SMS data bearer provides a mechanism whereby the wireless terminal can send a notification message to the packet-switched server while responding to the incoming circuit-switched page and/or answering the incoming circuit-switched call.

In some embodiments of the present invention, the packet-switched session may be a push-to-talk session that has been initiated by a user of a GSM/GPRS wireless terminal and that was established by a push-to-talk server. In response to receiving a circuit-switched page, the wireless terminal via, for example, a push-to-talk application that is running on the terminal, notifies the push-to-talk server that the push-to-talk session is to be temporarily suspended. This notification may be forwarded, for example, as either a text message or an e-mail message that is transmitted over the SMS data bearer. The message may include, for example, an identifier associated with the cellular telephone (e.g., a push-to-talk client ID), identification of the reason the push-to-talk session is being suspended, the expected interval of the suspension, etc. If other participants in the push-to-talk session attempt to communicate with the wireless terminal over the push-to-talk session during the period when the wireless terminal has suspended the session, the push-to-talk server may notify those participants that the wireless terminal is temporarily unavailable. In other embodiments of the present invention, such notice may automatically be provided in response to the push-to-talk server receiving notification that a terminal has temporarily suspended participation in an on-going push-to-talk session. The notification to other participants in the push-to-talk session, if provided, may be generated and forwarded by the wireless terminal and/or the push-to-talk server.

In other embodiments of the present invention, the notification message may be transmitted from the wireless terminal to the push-to-talk server via an IP-level connection (UDP/IP) using the SMS data bearer (as opposed to GPRS) as the transport mechanism. In such embodiments, the message is forwarded just like the other signaling and data packets except that the SMS data bearer is used.

In additional embodiments of the present invention, the notification message may be sent over the push-to-talk session (i.e., a GPRS link instead of, for example, the SMS data bearer) before the wireless terminal switches to respond to the circuit-switched page. In such embodiments, the notification message may, for example, be sent as a control message in the GPRS push-to-talk session as soon as the wireless terminal senses an incoming circuit-switched page. Once the notification message is sent, the wireless terminal may suspend GPRS operations and proceed to respond to the incoming circuit-switched page. Such embodiments of the present invention may be of particular interest with Class-B GSM terminals or other terminals that may not simultaneously support both circuit-switched and packet-switched communications.

In still further embodiments of the present invention, the notification message may be sent over a GPRS link during and/or after the wireless terminal responds to the circuit-switched page. This implementation may be of particular interest with Class-A and/or Dual Transport Mode terminals as such terminals can send data over the GPRS link during a circuit-switched call, and as it eliminates the need for the terminal to simultaneously handle two voice calls over circuit-switched connections.

The push-to-talk server may also be notified upon termination of the circuit-switched call. This may be accomplished, for example, by the wireless terminal forwarding a notification message via the SMS data bearer and/or through the GPRS bearer after the GPRS connection is resumed.

Figure 2:
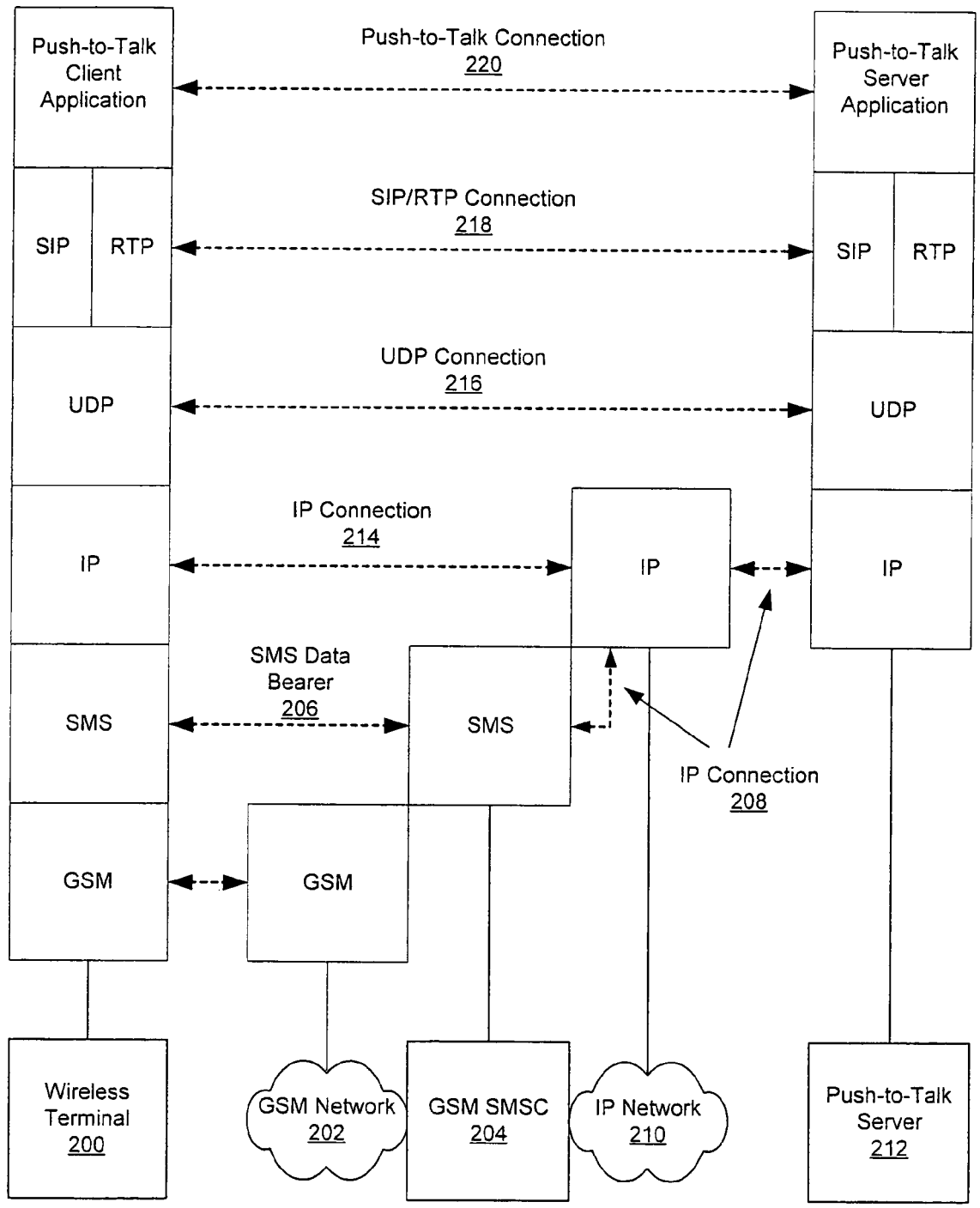
FIG. 2 is a schematic diagram illustrating different connectivities between a wireless terminal and a push-to-talk server.

FIG. 2 is a schematic diagram illustrating different methods that may be used for transporting notification messages pursuant to certain embodiments of the present invention. As shown in FIG. 2, a GSM cellular telephone or other wireless terminal 200 may communicate via circuit switched calls with other devices over a GSM network 202. The wireless terminal 200 also communicates with a GSM Simple Message Service Controller ("SMSC") 204 over an SMS data bearer 206. The GSM SMSC 204 communicates with a server 212 that controls a packet-switched session (in the example of FIG. 2, the application is a push-to-talk session). As shown in FIG. 2, this communication may be carried out via an IP level connection 208 over an IP network 210. The wireless terminal 200 may also maintain an IP level connection 214 with the IP network 210. In embodiments of the present invention, this IP connection 214 may be carried over the GSM SMS data bearer via the GSM SMSC 204. A UDP layer connection 216 and SIP/RTP layer connections 218 may also be established between the wireless terminal 200 and the push-to-talk server 212. Finally, a push-to-talk connection 220 may be established between a push-to-talk client application that may be running on the wireless terminal 200 and a push-to-talk server application that is running on the push-to-talk server 212.

Figure 3:
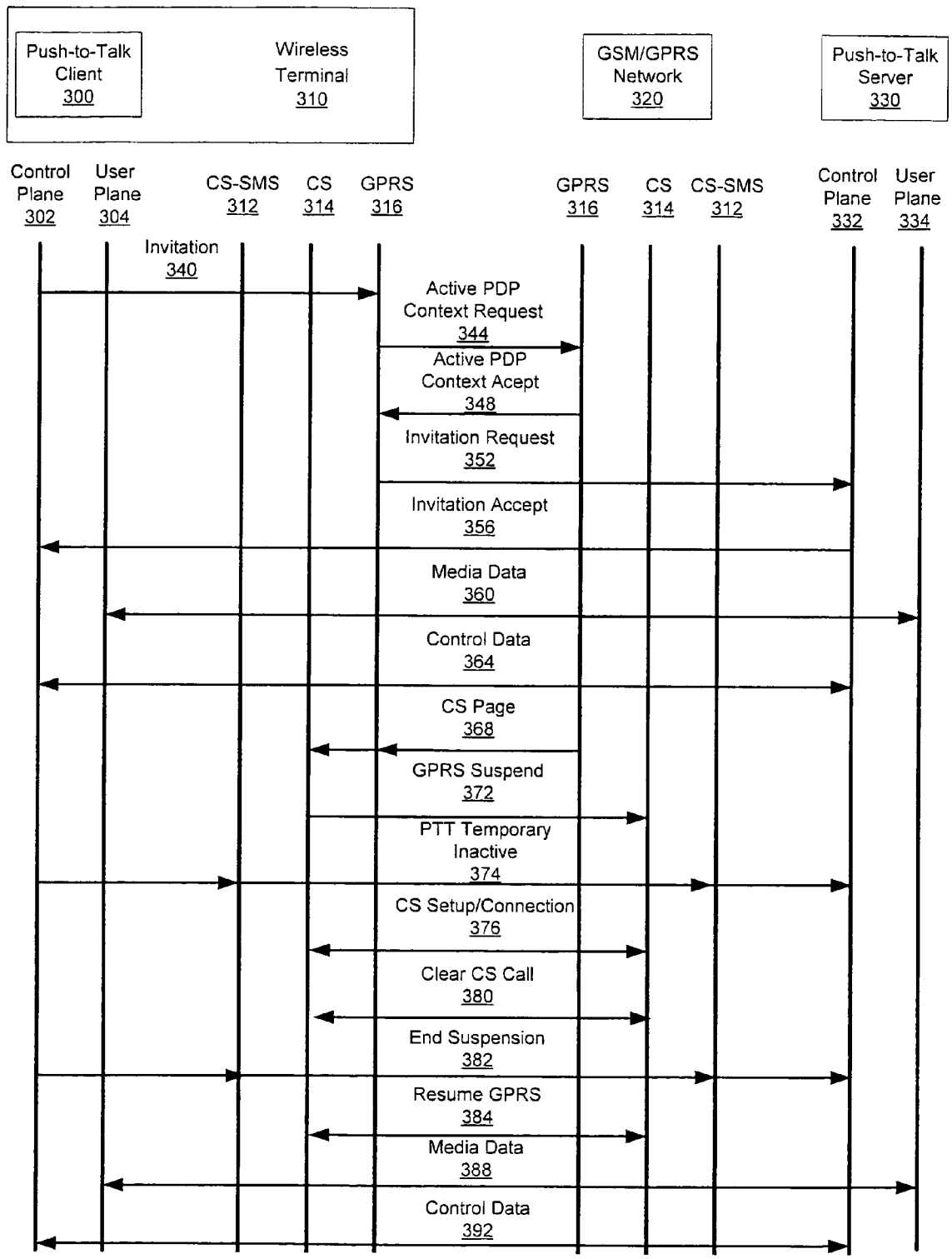
FIG. 3 is a diagram illustrating a message flow that may be used to temporarily suspend a push-to-talk communications session according to some embodiments of the present invention.

FIG. 3 illustrates an exemplary message flow according to some embodiments of the present invention that may pass between a wireless terminal and other network and/or remote devices when the wireless terminal suspends a push-to-talk session in order to receive a circuit-switched call. As shown in FIG. 3, a push-to-talk application or "client" 300 may be resident on a wireless terminal 310. The push-to-talk client may include a control plane 302 (i.e., a capability to forward and receive control messages/information) and a user plane 304 (i.e., a capability to forward and receive push-to-talk communications or "media data"). As further shown in FIG. 3, the wireless terminal 310 may communicate over a circuit-switched SMS ("CS-SMS") data bearer 312, a circuit-switched channel 314, and over a GPRS packet-switched channel 316. The wireless terminal 310 and the push-to-talk client 300 communicate with a GSM/GPRS network 320 and with a push-to-talk server 330. The GSM/GPRS network 320 supports GPRS, circuit-switched and SMS traffic. The push-to-talk server 330 may include a control plane 332 and a user plane 334.

As shown in FIG. 3, the push-to-talk client 300 (which is running on the wireless terminal 310) may initiate establishment of a push-to-talk session via an invitation 340. In response to the invitation 340, the wireless terminal 310 transmits an Active PDP Context Request 344 to the GSM/GPRS network 320 to establish a PDP context that may be used to support an IP connection between the wireless terminal 310 and the push-to-talk server 330. The GSM/GPRS network 320 transmits an Active PDP Context Accept message 348 to the wireless terminal 310 notifying the wireless terminal that the PDP Context Request has been accepted. The wireless terminal 310 then forwards an invitation request message 352 to the push-to-talk server 330 over the IP connection, and the push-to-talk server 330 establishes the push-to-talk session. The push-to-talk server 330 may also forwards an invitation acceptance message 356 that the registration was successful to the push-to-talk client 300. Once the session is established, the push-to-talk client 300 may transmit and receive media data 360 with the other user(s) participating in the push-to-talk session via the push-to-talk server 330. The push-to-talk client 300 and the push-to-talk server 330 may also exchange control data 364 while the push-to-talk session is active.

As shown in FIG. 3, during the push-to-talk session, the wireless terminal 310 may receive a circuit-switched page 368. In response to this circuit-switched page 368, the wireless terminal 310 may send a GPRS suspend notification 372 to the GSM/GPRS network 320. This notification 372 notifies the GSM/GPRS network 320 that GPRS communications (i.e., the push-to-talk session) are being suspended. Additionally, the push-to-talk client 300 may forward a push-to-talk ("PTT") temporary inactive notification 374 of the temporary suspension of the push-to-talk session to the push-to-talk server 330. This notification may be sent before, during, or after the GSM/GPRS network 320 and the wireless terminal 310 set-up and connect the circuit switched call 376. After the circuit switched call is completed, it is cleared 380. At this point, an "end suspension" notification 380 may be forwarded from the push-to-talk client 300 to the push-to-talk server 330 to notify the push-to-talk server 330 that the temporary suspension of the push-to-talk session is over. The GPRS sessions are resumed 382. Media data 388 and control data 392 may be exchanged between the push-to-talk client 300 and the push-to-talk server 330 with resumption of the push-to-talk session.

The notification message 374 that is forwarded from the push-to-talk client 300 to the push-to-talk server 330 may be implemented in a variety of ways. As noted above, in certain embodiments of the present invention, it may comprise an e-mail or text message that provides specified information regarding the suspension of the packet-switched session. In other embodiments, the notification message may, for example, comprise digital or alphanumeric codes that serve to notify the push-to-talk server and/or other devices that the wireless terminal is temporarily suspending participation in the packet-switched session.

Figure 4:
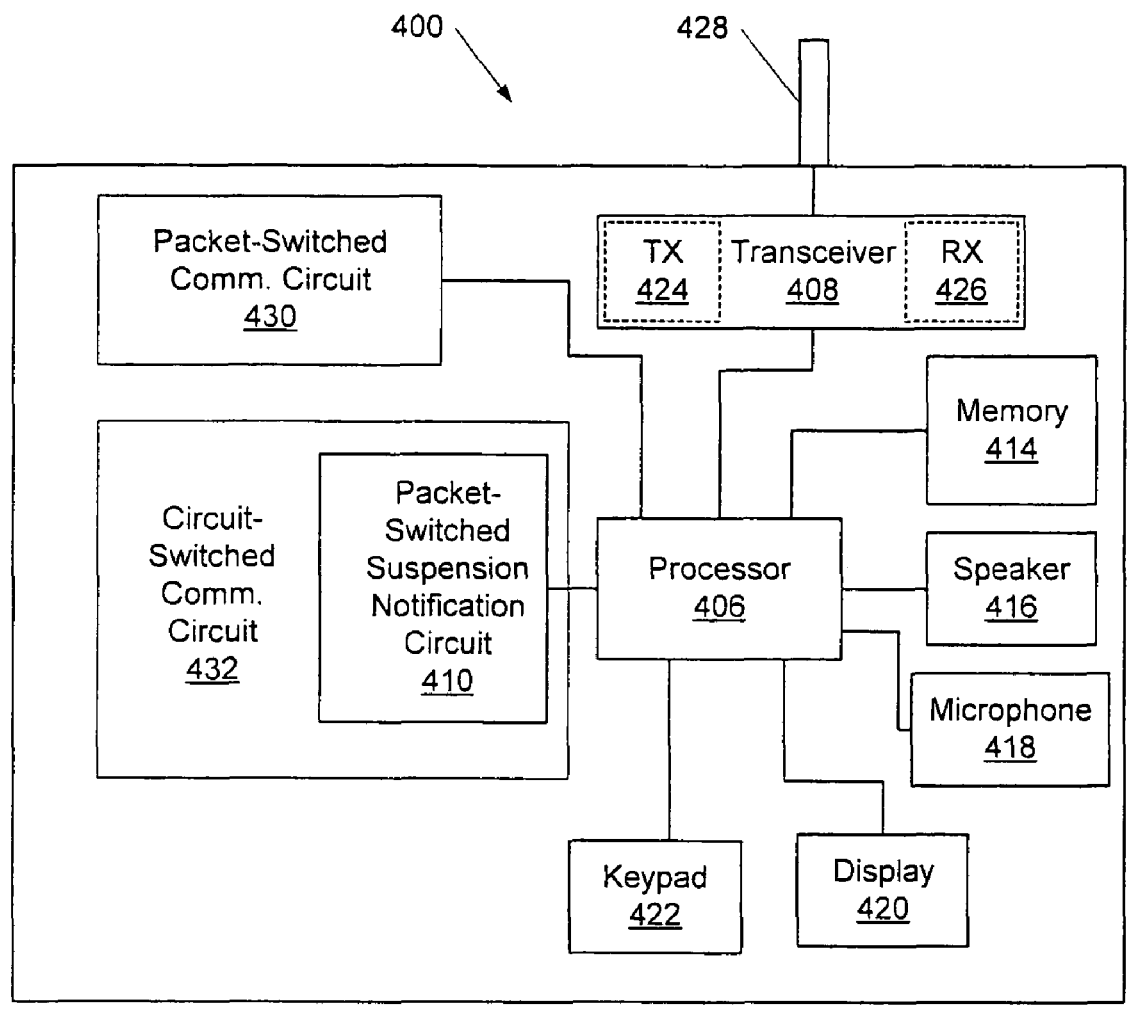
FIG. 4 is a functional block diagram of a wireless terminal according to some embodiments of the present invention.

FIG. 4 is a block diagram of an exemplary wireless terminal 400 according to some embodiments of the present invention. The wireless terminal 400 includes a processor 406, a transceiver 408 (that includes a transmitter 424 and a receiver 426), a packet-switched suspension notification circuit controller 410, a packet-switched communications circuit 430, a circuit-switched communications circuit 432, a memory 414, a speaker 416, a microphone 418, a display 420, and a keypad 422, which may be at least partially within a housing 412. The packet-switched suspension notification circuit 410 may, for example, comprise part of the packet-switched communications circuit 430 or the circuit-switched communications circuit 432

The memory 414 may include one or more erasable programmable read-only memories (EPROM or Flash EPROM), battery backed random access memory (RAM), magnetic, optical, or other digital storage device, and may be separate from, or at least partially within, the processor 406. The processor 406 may include more than one processing component, such as, for example, a general purpose processor and a digital signal processor, which may be enclosed in a common package or separate and apart from one another. The transceiver 408 typically, but not necessarily, includes both a transmitter 424 and a receiver 426 to support two way communications. The wireless terminal 400 may, thereby, communicate with a wireless communications network using radio frequency signals. The radio frequency signals may be communicated through an antenna 428 according to one or more cellular communication protocols.

The packet-switched suspension notification circuit 410 may be used to generate notification messages that notify a packet-switched server that the wireless terminal is temporarily suspending a packet-switched communications session. In embodiments of the present invention, the packet-switched suspension notification circuit 410 may be implemented as a software program or routine that runs on the processor 406 that generates notification messages that may be forwarded when the wireless terminal 400 temporarily suspends a packet-switched session. The notification messages may be pre-selected messages that are stored in the packet-switched suspension notification circuit 410 and/or in the memory 414 or in another location within the wireless terminal 400, or they may be messages that are generated based on specific attributes of each particular suspension. Moreover, as discussed above, the notification message need not be a text or e-mail message, but may also be, for example an audio tone or an alphanumeric code that conveys information regarding the wireless terminal 400 temporarily suspending one or more packet-switched sessions.

Figures 5, 6:
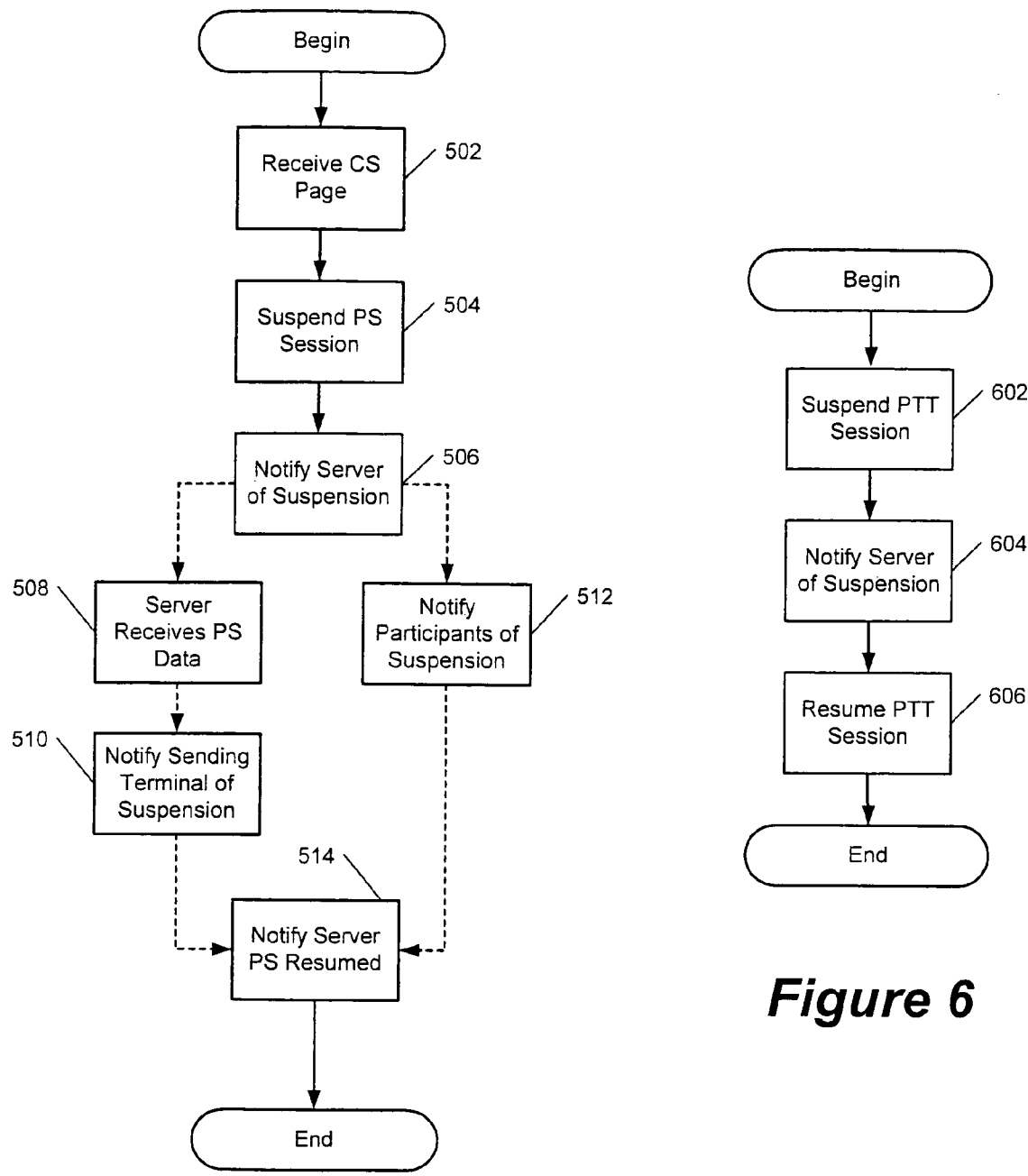
FIG. 5 is a flow chart diagram illustrating operations for providing notice of receipt of an incoming circuit-switched call according to some embodiments of the present invention.
FIG. 6 is a flow chart diagram illustrating operations for temporarily suspending a push-to-talk communications session according to some embodiments of the present invention.

FIG. 5 is a flow chart illustrating operations through which network elements may be notified that a wireless terminal 400 that is participating in a packet switched communications session has received an incoming circuit-switched call. As shown in FIG. 5, operations may begin with the wireless terminal 400 receiving a page indicating that the wireless terminal 400 has received an incoming circuit-switched call (block 502). Upon receiving the page, the wireless terminal 400 may suspend the packet-switched communications session (block 504) in order to answer the incoming circuit-switched call. As discussed above, depending, for example, on the capabilities of the wireless terminal 400 and the type of packet-switched communications session that is ongoing, suspension of the packet-switched session may or may not be necessary. The wireless terminal 400 also generates a notification message that is forwarded to a network server associated with the packet-switched communications session (block 506). This notification message may notify the server that the wireless terminal 400 has temporarily suspended participation in the ongoing packet-switched communications session. The notification message may include further information such as, for example, an identifier associated with the wireless terminal 400 with respect to the ongoing packet-switched communications session, the reason for the temporary suspension of the session, an estimated length of the suspension period or the like. As discussed above, in certain embodiments of the present invention the operations at block 506 may be performed in advance of the operations at block 504.

As shown in FIG. 5, after receiving the notification message, the network server may receive data associated with the ongoing packet-switched communications session that is to be forwarded to the wireless terminal 400 (block 508). In embodiments of the present invention, upon receipt of such data, the server generates and sends out a message to the terminal from which such data was received that notifies the sending terminal that the wireless terminal 400 has temporarily suspended operations with respect to the ongoing packet-switched communications session (block 510). In other embodiments of the present invention, the wireless terminal 400 may generate notification messages that are forwarded directly to other participants of the packet-switched communications session (block 512). At the conclusion of the circuit-switched call, the wireless terminal 400 may notify the server that the temporary suspension is over and/or that the wireless terminal 400 will reinitiate its participation in the packet-switched communications session (block 514).

FIG. 6 is a flow chart diagram illustrating operations for a wireless terminal 400 to temporarily suspend its participation in a push-to-talk session. As shown in FIG. 6, operations may start at block 602 with the wireless terminal 400 temporarily suspending the push-to-talk ("PTT") session for some reason (e.g., upon receipt of an incoming circuit-switched page). The wireless terminal 400 notifies the push-to-talk communications server that controls the push-to-talk session regarding this suspension (block 604). This notification may be forwarded before, during or after suspension of the push-to-talk session by the wireless terminal 400, and it may be forwarded directly or indirectly to the push-to-talk communications server. At some point (e.g., after the wireless terminal 400 terminates an incoming circuit switched call that resulted in suspension of the push-to-talk session), the wireless terminal 400 may resume participation in the push-to-talk session (block 606).

In the drawings and specification, there have been disclosed typical illustrative embodiments of the invention and, although specific terms are employed, they are used in a generic and descriptive sense only and not for purposes of limitation, the scope of the invention being set forth in the following claims.

What is claimed is:

1. A method for a wireless terminal participating in a packet-switched communications session to provide notice of receipt of an incoming circuit-switched call, the method comprising:
   receiving a paging request associated with the incoming circuit-switched call; and
   notifying a server that establishes and runs the packet-switched communications session that the wireless terminal has received the incoming circuit-switched call,
   wherein notifying the server that establishes and runs the packet-switched communications session that the wireless terminal has received the incoming circuit switched call comprises forwarding a notification message from the wireless terminal to the server over a circuit-switched channel.

2. The method of claim 1, wherein the incoming circuit-switched call comprises a circuit-switched call transmitted over a GSM network, and wherein the circuit-switched channel is the SMS data bearer.

3. The method of claim 2, wherein the notification message comprises a text message or an e-mail message transmitted over the SMS data bearer.

4. The method of claim 2, wherein the notification message is forwarded via an IP level connection over the SMS data bearer.

5. The method of claim 1, wherein the notification message includes an identification associated with the wireless terminal and an estimate of the duration of the incoming circuit-switched call.

6. The method of claim 1, further comprising notifying the server that establishes and runs the packet-switched communications session upon termination of the incoming circuit-switched call.

7. The method of claim 6, wherein the notification forwarded upon termination of the incoming circuit-switched call is forwarded over a circuit-switched channel.

8. The method of claim 1, wherein the packet-switched communications session comprises a push-to-talk session and wherein the server that establishes and runs the packet-switched communications session comprises a server running a push-to-talk application.

9. The method of claim 8, wherein notifying the server that establishes and runs the packet-switched communications session that the wireless terminal has received the incoming circuit-switched call comprises notifying the server that the wireless terminal has suspended the push-to-talk session.

10. The method of claim 9, wherein the circuit-switched channel is the SMS data bearer.

11. A wireless terminal, comprising:
a transceiver;
a packet-switched suspension notification circuit coupled to the transceiver that is configured to generate a notification message that is suitable for transmission as an e-mail message or a text message over a circuit-switched SMS data bearer to a server controlling a packet-switched communications session when the wireless terminal temporarily suspends participation in the packet-switched communications session; and
a circuit-switched communications circuit, wherein the packet-switched suspension notification circuit generates the notification message in response to receipt of a circuit-switched page by the circuit-switched communications circuit.

12. A computer program product implemented in a wireless terminal that is participating in a packet-switched communications session that provides notice of receipt of an incoming circuit-switched call, comprising:
a non-transitory computer readable medium having computer readable program code embodied therein, the computer readable program code comprising:
computer readable program code configured to receive a paging request associated with the incoming circuit-switched call; computer readable program code configured to notify a server that establishes and runs the packet-switched communications session via a text message or an e-mail message that is transmitted over a circuit-switched SMS data bearer channel that the wireless terminal has received the incoming circuit-switched call; and computer readable program code configured to notify the server that establishes and runs the packet-switched communications session over the circuit-switched SMS data bearer channel upon termination of the incoming circuit-switched call.

13. A method for a wireless terminal participating in a packet-switched communications session to provide notice of receipt of an incoming circuit-switched call, the method comprising:
receiving a paging request associated with the incoming circuit-switched call;
notifying a server that establishes and runs the packet-switched communications session that the wireless terminal has received the incoming circuit-switched call, wherein notifying the server that establishes and runs the packet-switch communications session that the wireless terminal has received the incoming circuit-switched call comprises forwarding a first notification message from the wireless terminal to the server over a circuit-switched SMS data bearer channel; and
forwarding a second notification message from the wireless terminal to the server that establishes and runs the packet-switched communications session via a text message or an e-mail message that is transmitted over the circuit-switched SMS data bearer channel upon termination of the incoming circuit-switched call;
wherein the incoming circuit-switched call comprises a circuit-switched call transmitted over a GSM network.

14. The method of claim 13, wherein the packet-switched communications session comprises a push-to-talk session, wherein the server that establishes and runs the packet-switched communications maintains a Packet Data Protocol context associated with the push-to-talk session throughout the duration of the circuit-switched call, and wherein the method further comprises resuming the push-to-talk session under the existing Packet Data Protocol context after termination of the circuit-switched call.

15. The method of claim 14, further comprising notifying a remote wireless terminal that is part of the push-to-talk session that the wireless terminal has temporarily suspended participation in the push-to-talk session.

16. The method of claim 13, wherein the first notification message includes an identification associated with the wireless terminal and an estimate of the duration of the incoming circuit-switched call.

17. A method for a wireless terminal participating in a packet-switched communications session to provide notice of receipt of an incoming circuit-switched call, the method comprising:
receiving a paging request associated with the incoming circuit-switched call;
forwarding a first notification message from the wireless terminal to a server that establishes and runs the packet-switched communications session over a circuit-switched SMS data bearer channel that notifies the server that the wireless terminal has suspended the packet-switched communications session, the first notification message including an identification associated with the wireless terminal and an estimate of the duration of the incoming circuit-switched call;
forwarding a second notification message from the wireless terminal to the server that establishes and runs the packet-switched communications session via a text message or an e-mail message that is transmitted over the circuit-switched SMS data bearer channel upon termination of the incoming circuit-switched call that notifies the server that the incoming circuit-switched call has been terminated; and
resuming the packet-switched communication session after termination of the circuit-switched call;
wherein the incoming circuit-switched call comprises a circuit-switched call transmitted over a GSM network.

\* \* \* \* \*